July 27, 1954  S. WEINBERG  2,684,530
CUTTING MACHINE
Filed May 24, 1950  5 Sheets-Sheet 5
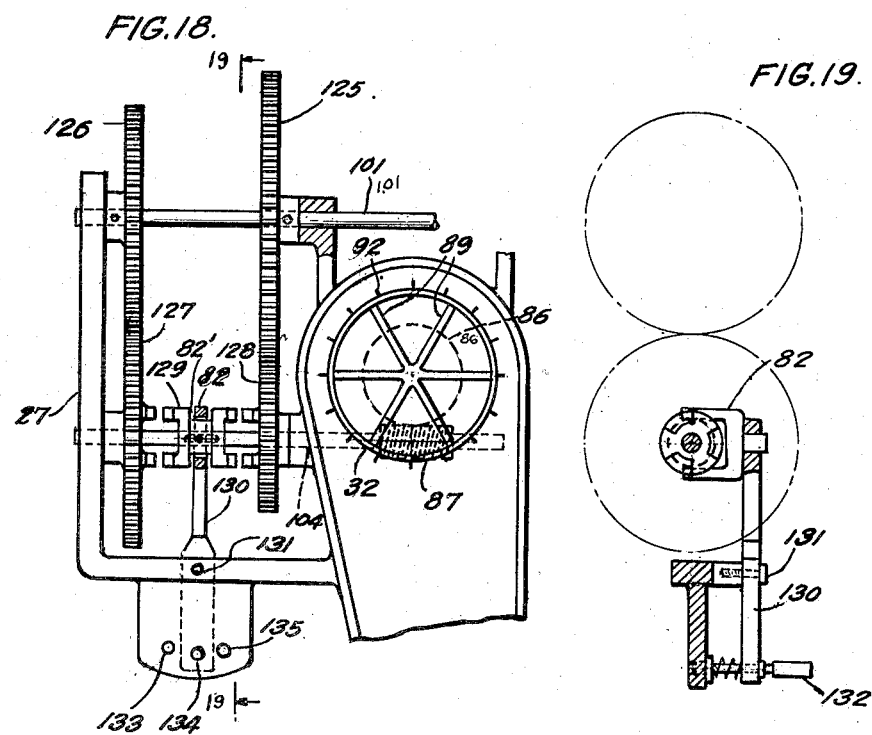
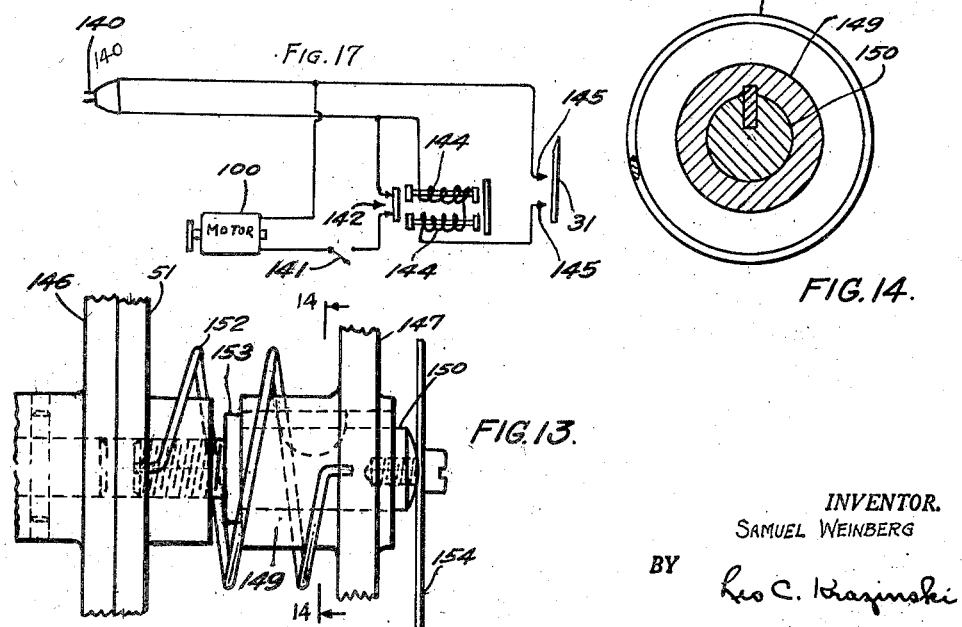
INVENTOR.
SAMUEL WEINBERG
BY
Leo C. Krazinski
attorney Patented July 27, 1954

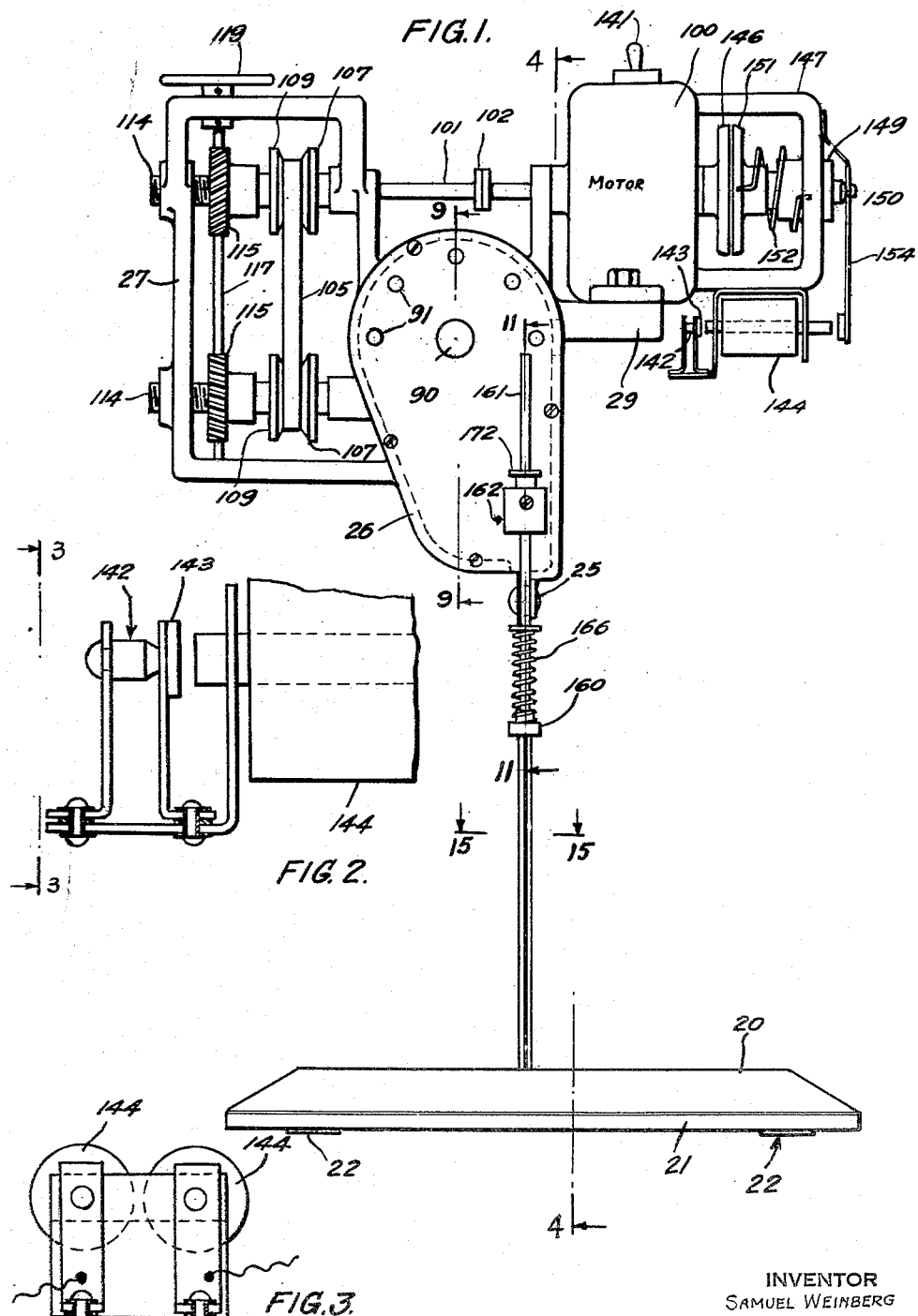

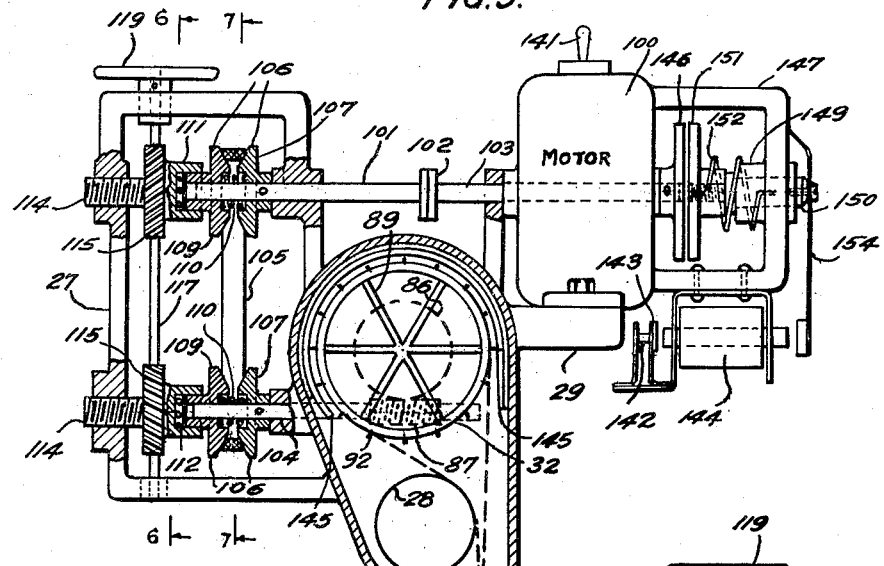
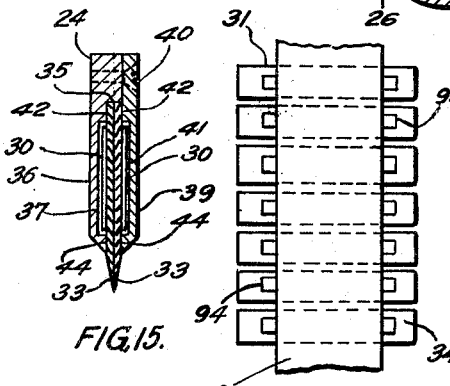
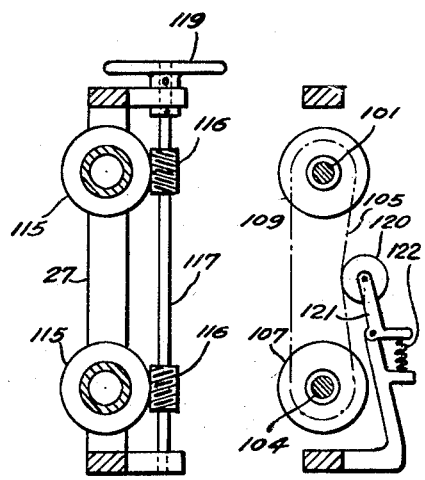
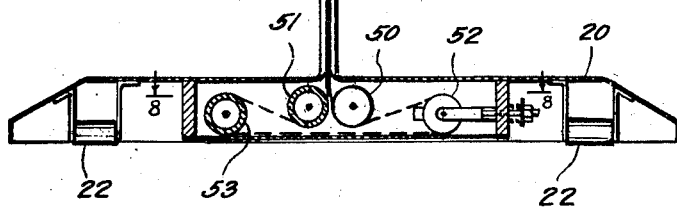

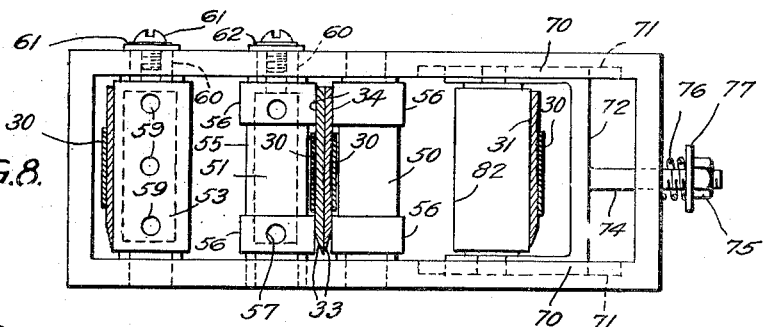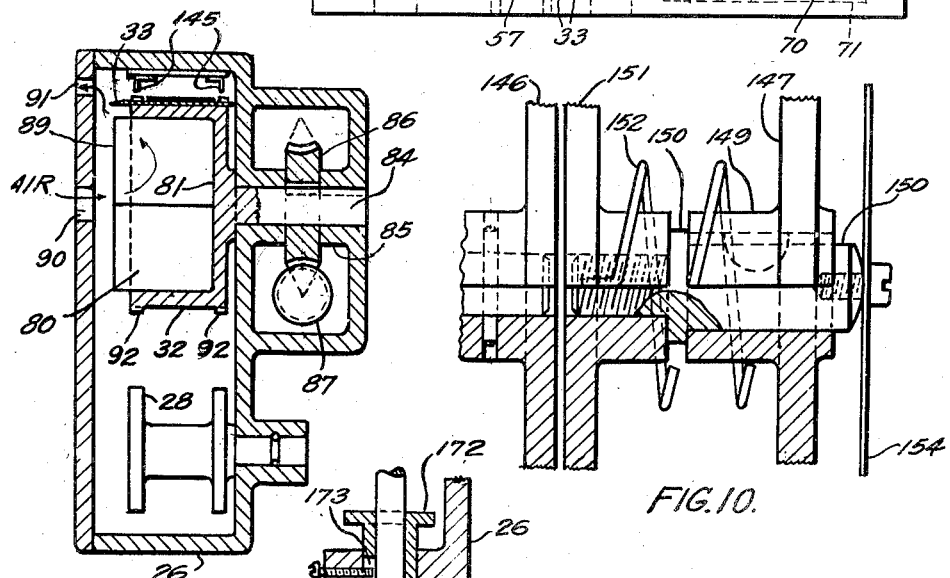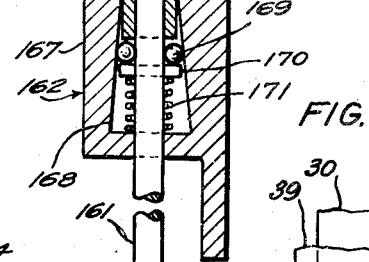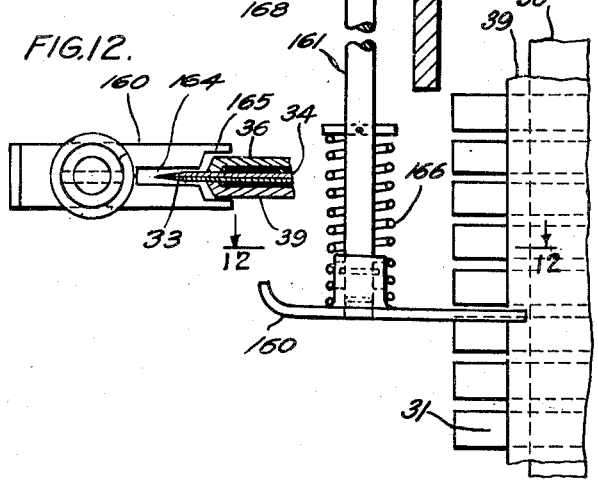

2,684,530

UNITED STATES PATENT OFFICE 2,684,530

CUTTING MACHINE

Samuel Weinberg, Brooklyn, N. Y.

Application May 24, 1950, Serial No. 163,969

10 Claims. (Cl. 30—123)

The present invention relates to cutting machines utilizing a flexible endless belt type of cutting element, and, more praticularly, relates to improvements in such machines adapted for cutting a plurality of layers of cloth or the like.

Accordingly, an object of the present invention is to provide such a machine wherein the cutting element is more practical in construction and operation.

Another object is to provide such a machine wherein the cooperating cutting edges of the element are guided adjacent to each other and in alignment.

Another object is to provide means for taking slack out of the flexible cutting element without interfering with its cutting effectiveness.

Another object is to provide means for varying the speed at which the cutting element is operated.

Another object is to provide means for effecting immediate stoppage of the machine in the event of breakage or displacement of the cutting element.

Another object is to provide means for lubricating the cutting element.

A further object is to arrange the foregoing elements in a simple and effective manner whereby the machine is economical in construction.

Other and further objects will be obvious upon an understanding of the illustrative embodiments about to be described, or will be indicated in the appended claims, and various advantages not referred to herein will occur to one skilled in the art upon employment of the invention in practice.

A preferred embodiment of the invention has been chosen for purposes of illustration and description as is shown in the accompanying drawing, forming a part of the specification, wherein:

Fig. 1 is a front elevational view of a cutting machine in accordance with the invention.

Fig. 2 is an enlarged fragmentary elevational view, illustrating a detail of the electric switch for the stop motion mechanism.

Fig. 3 is an end view of the switch mechanism shown in Fig. 2 as viewed along the line 3—3.

Fig. 5 is a sectional view taken along the line 5—5 on Fig. 4.

Fig. 6 is a sectional view taken substantially along the line 6—6 on Fig. 5, illustrating a detail of the speed varying mechanism.

Fig. 7 is a sectional view taken substantially along the line 7—7 on Fig. 5, illustrating another detail of the speed varying mechanism.

Fig. 8 is an enlarged sectional view taken substantially along the line 8—8 on Fig. 5, illustrating details of the lubricating mechanism.

Fig. 9 is an enlarged sectional view, taken along the line 9—9 on Fig. 1, illustrating details of the cooling mechanism.

Fig. 10 is an enlarged fragmentary view partly in elevation and partly in section, illustrating details of a brake associated with the stop motion mechanism.

Fig. 11 is an enlarged sectional view taken substantially along the line 11—11 on Fig. 1, illustrating a pressure foot for engaging the top layer of a pile of cloth and adjusting means for the foot.

Fig. 12 is a sectional view taken along the line 12—12 on Fig. 11, illustrating the relation of the pressure foot and the cutting element.

Fig. 13 is a view similar to Fig. 10 illustrating the elements of the brake in locked position.

Fig. 14 is a sectional view taken along the line 14—14 on Fig. 13.

Fig. 15 is an enlarged fragmentary sectional view taken along the line 15—15 on Fig. 1, illustrating the cutting element guide.

Fig. 16 is an enlarged fragmentary elevational view, illustrating the endless belt and the cutting element blades thereon.

Fig. 17 is a diagrammatic view of a control circuit for the drive of the machine and the stop motion mechanism.

Fig. 18 is a fragmentary elevational view illustrating a modified speed varying mechanism.

Fig. 19 is a sectional view taken along the line 19—19 on Fig. 18.

Figure 4:
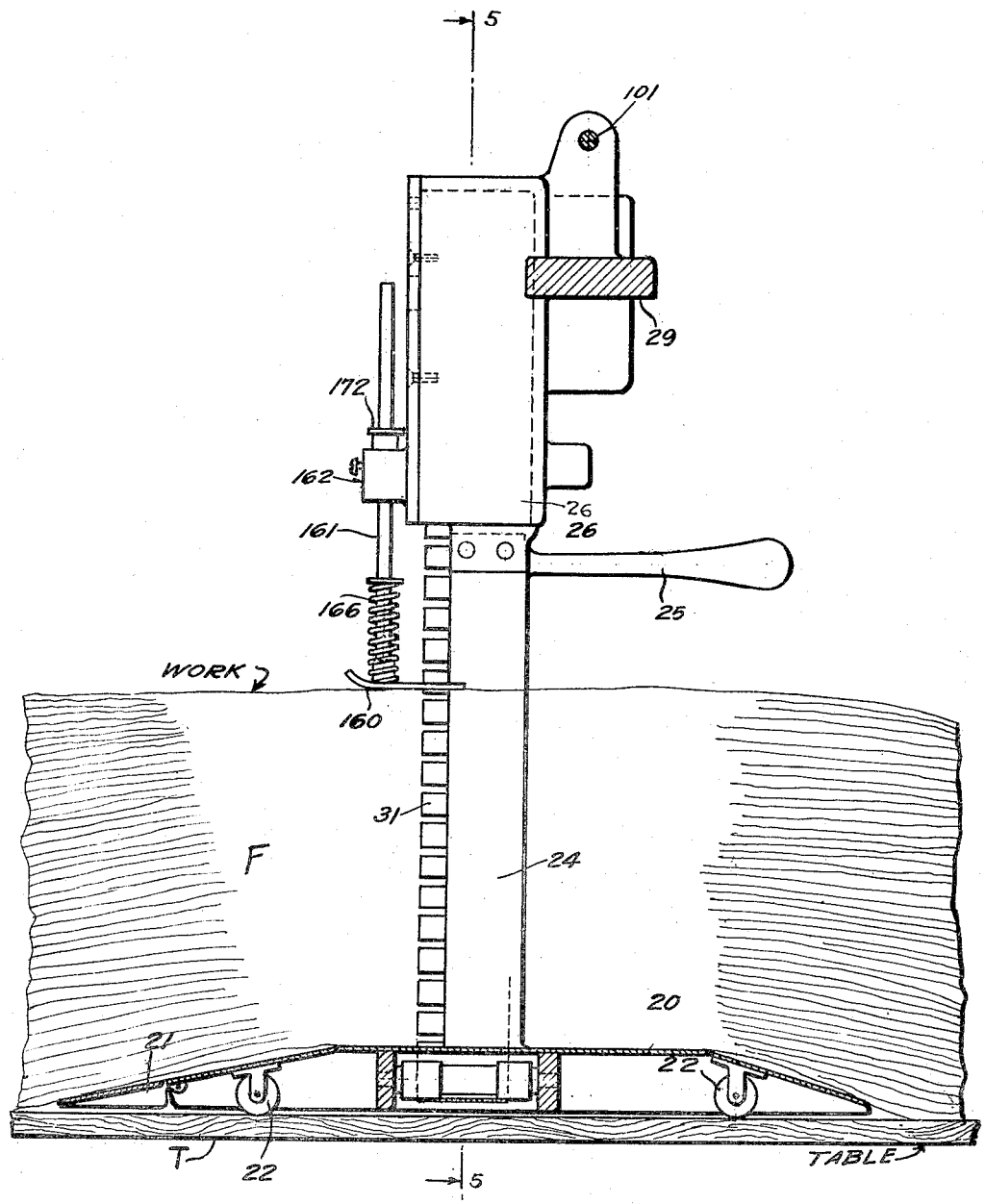
Fig. 4 is a sectional view taken along the line 4—4 on Fig. 1.

Referring to the drawings in detail and more particularly to Figs. 1, 4, and 5 thereof, there is shown a cutting machine the structural elements of which generally comprise a mobile base casing 20 having an inclined and flexible leading edge 21 (Fig. 4) for guiding the base under a stack or pile of fabric F and having rollers 22 for moving the machine across a cutting table T supporting the fabric; an upright column 24 on the casing 20 having a handle 25 adjacent its upper end for steering the machine across the table to follow the cutting pattern; and frame structure supported by the column at its upper end including a housing 26, and brackets 27 and 29 at the respective sides of the housing, the purpose of which will be described hereinafter.

*The cutting element belt and guide therefor*

As shown more particularly in Figs. 4, 5, 11, 12, 15, and 16, a flexible endless belt 30, such as a metallic fabric strip, having cutting elements 31, such as metallic blades mounted thereon, is supported by upper roll means, such as a driving drum 32 and an idler 28 in the housing 26 and by lower roll means (to be described in detail hereinafter) in the base casing 20 (Fig. 5), whereby two strands moving in opposite directions are provided between the upper and lower roll means.

The blades 31 are substantially rectangular in shape and are secured to the inner side of the belt strip 30 preferably by spot welding them to position the same in lengthwise spaced relation along the strip and in transversely extending relation thereon with each end of the blades projecting laterally beyond the belt strip (Figs. 15 and 16). One end of each blade is formed with a cutting edge 33 facing in the direction of the leading end of the machine, and the opposite end 34 of each blade serves to index the blades in a belt guide 35 provided in the column 24.

The guide 35 serves to position the two belt strands in alignment with each other, so that the cutting edges 33 of blades moving in opposite directions provide a continuous shearing action adapted to cut the fabric F. The guide 35 also prevents the blades 31 from receding into the column 24 during the cutting operation, which recession has been an objection in some of the prior art devices. The belt guide 35 comprises an elongated strip 36 (Fig. 15) fixed to the column and having a central recess 37 dimensioned to receive one strand of the belt strip, and a second elongated strip 39 adapted to be detachably secured to the column 24 by screws 40 and having a recess 41 similar to the recess 37 for receiving the other strand of the belt strip. Strip 39 is preferably of spring material adapted to impress a slight pressure to take up wear of the blades 31 to keep them always in contact with each other. Indexing guide surfaces 42 are shown provided in strips 37 and 39 for guiding the outer sides of the ends 34 of the blades; and each of these strips is recessed at the outer end to provide a narrow slit through which the cutting edges 33 project and to provide a guide surface 44 for the outer sides of the blades just inwardly of the edges 33.

The lubricating system

Since the blades moving with the associated opposite strands of the belt are in sliding contact with each other across the width thereof and the end portions of the blades are in rolling contact with the roll means and in sliding contact with guiding and indexing surfaces, it is desirable to lubricate these portions of the blades to minimize wear thereof, while taking the precaution not to lubricate the belt strip so as to soil the material that is being cut. This may be accomplished by a lubricating system shown in Figs. 5 and 8 which for expedience is combined with the lower roll means mounted in the base casing 20. This system comprises four generally cylindrical idler rollers 50, 51, 52, and 53 of which rollers 51 and 53 are hollow and are adapted to contain a suitable lubricant.

The rollers 50 and 51 are mounted adjacent each other just below the belt guide (Fig. 5) and are formed with a central recess 55 (Fig. 8) dimensioned to receive the belt strip 30 and have cylindrical rims or ferrules 56 at each end in rolling contact with the outer surfaces of the ends 33 and 34 of the blades which slidably engage the guide surfaces 42 and 44. The rim 56 of the roller 51 has one or more apertures 57 therein through which lubricant is applied to these blade surfaces.

The rollers 52 and 53 are positioned respectively at the sides of the rollers 50 and 51 in spaced relation to provide an arrangement whereby the two strands pass under the rollers 50 and 51 and are looped about the rollers 52 and 53 (Fig. 5). The rollers 52 and 53 have a continuous cylindrical surface for engaging in rolling contact the inner surfaces of the blades 31 which slidably engage each other when positioned in the guide. The roller 53 has a plurality of laterally spaced apertures 59 formed in its blade engaging surface through which lubricant is applied to the inner surfaces of the blades.

As shown in Fig. 8, provision is made for filling the rollers 51 and 53 with lubricant, for example, by extending an apertured axle or hub section 60 of these rollers to the exterior of the base casing and threadedly securing a plug 61 in the aperture which carries a sealing gasket 62.

Belt slack take-up means

It is desirable to move the belt carrying the cutting elements at a relatively high speed in order to cut a large number of layers of fabric simultaneously, and because of such high speed operation the belt should be taut and should have any slack removed therefrom tend to set up undesirable vibrations which might adversely affect the shearing action of the blades or might impair the blades.

As shown in Fig. 8, simplified slack take-up means may be provided by rotatably mounting the roller 52 between the legs 70 of a U-shaped bracket, which legs are slidably mounted in slots 71 formed in the base casing 20. The portion 72 connecting the legs 70 has a stem 74 secured thereto which extends outwardly through the base casing and is threaded at its outer end for reception of a nut 75. A strong spring 76 is coiled about the outwardly extending portion of the stem and one end thereof engages the outer wall of the casing and the other end engages a washer 77 on the stem adapted to be adjustably positioned by the nut 75 to load the spring 76 and thereby cause the roller 52 to be positioned to take the slack out of the belt.

The cooling system

Also, in view of the high speed operation of the belt and because sliding contact between surfaces of the blades, as well as between the blades and guide surfaces, and between the blade surfaces and the fabric, the blades become heated and may damage the fabric, particularly if the fabric is of the synthetic polymer type. Also, undue heating of the blades may cause the cutting edges to be dulled by taking the temper out of the metal of which they are formed. In order to guard against such contingencies, it is desirable to effect continuous cooling of the blades to prevent overheating thereof. This may be advantageously accomplished by utilizing the drive drum 32 as a centrifugal fan or blower for circulating air in a manner to cool the blades as they pass through the drum housing 26.

As shown in Figs. 5 and 9, the drum 32 is hollow and is formed with an open end 80 and a closed end wall 81 spaced from the housing wall. The drum is mounted for rotation in the housing by an axle 84 supported in a bearing 85 and carries a pinion 86 adapted to be driven by a worm 87, which is part of the drive mechanism to be described hereinafter.

The interior of the drum has a plurality of vanes 89 arranged therein for sucking air into the drum and blowing the same over the cutting edges of the blades, and thereby cooling the blades. For example, this may be accomplished by forming an inlet aperture 90 in the housing wall adjacent the open end of the drum, which aperture is in horizontal alignment with the center of the drum, and forming an outlet aperture 91 in the upper housing wall, which aperture is disposed beyond the outer periphery of the drum. In this manner air, as shown by the arrows, may be sucked into the drum through the aperture 90, forced by centrifugal action out of the drum and over the cutting edges 33, circulated about the exterior of the drum and the belt carrying the cutting elements, and finally forced out through the aperture 91.

The outer periphery of the drum 32 is shown provided with a plurality of spaced teeth 92 for mesh engagement with correspondingly spaced openings 94 (see Fig. 16) on the blade 31. It can thus be readily seen that rotation of the drum will result in a positive drive for the cutting blades.

The drive mechanim

In Figs. 1, 5, 6, and 7, a drive mechanism is illustrated which essentially comprises a motor 100 mounted on the bracket 29 and a variable speed system supported by the bracket 27 for rotating the drum 32.

The variable speed system comprises an upper drive shaft 101 connected by a coupling 102 to one end of the motor drive shaft 103 and a lower driven shaft 104 which carries the worm 87. The shafts 101 and 104 are interconnected by a V-belt 105 passing over pulleys 106 on the respective shafts. The pulleys are of the split V-section type and comprise a section 107 fixed on the respective shafts, a slidably mounted section 109 and a spring 110 between the fixed and sliding sections for normally urging the sections apart. By adjusting the relative positions of the sections of each pulley the driving effectiveness of the belt may be varied whereby the speed at which the driven shaft is rotated may accordingly be varied.

Sliding movement of the pulley sections 109 may be effected by cup-shaped bearing members 111 comprising an internal end thrust bearing 112 engaged by the hub of the sections 109, an axial section 114 threaded through the bracket 27, and a pinion 115. Movement of the bearing members 111 is effected by worms 116 on a manually operable shaft 117 having a hand wheel 119, the worms 116 meshing with the pinions 115 to turn the bearing members and screw them inwardly or outwardly, as desired, of the bracket.

As shown in Fig. 6, the upper worm and pinion may have right hand threads and the lower worm and pinion may have left hand threads, so that the pulley sections 109 are adapted to be moved in opposite directions upon turning of the shaft 117.

A belt tightener is shown in Fig. 7 which comprises an idler 120 carried by an arm 121 that is urged in a direction to cause the idler to tighten the belt by a spring 122.

In Figs. 18 and 19 a modified variable speed drive system is illustrated which is of the two speed type. This system comprises spur gears 125 and 126 fixed for rotation on the upper or drive shaft 101; spur gears 127 and 128 mounted for free rotation on the lower or driven shaft 104, and meshing respectively with the gears 125 and 126, the gears 126 and 127 being preferably of equal diameters and the gears 125 and 128 being of different diameters; and a clutch element 129 slidably mounted between the gears 127 and 128 and fixed for rotation with the shaft 104 by a slot and pin arrangement. The clutch element has teeth at each side for selectively engaging similar teeth on the gears 127 and 128, and is adapted to be shifted to the left, as viewed in Fig. 18, for driving connection with the gear 127 or to the right for driving connection with the gear 128, the clutch element as illustrated being in a neutral position. In this manner the shaft 104 may be driven at one speed by means of gears 126 and 127 and at a higher speed by means of gears 125 and 128.

Shifting of the clutch element 129 is effected by a lever 130 pivotally mounted at 131 and carrying a fork 82 which is received in an annular groove 82' of the clutch element. A spring urged pin 132 is adapted to be selectively positioned in apertures 133, 134 and 135 to lock the element in high speed, neutral, and low speed positions, respectively.

The stop motion mechanism

The stop motion mechanism is illustrated in Figs. 1, 2, 3, 9, 10, 13, 14, and 17, and generally comprises a switch adapted to be opened automatically to disconnect the motor 100 from its source of electrical energy in the event of a break in the belt 30. As shown in Fig. 17, this may be accomplished by providing a circuit for connecting the motor to a source of energy 140 which circuit includes a master switch 141 for operating the motor at will and a normally closed switch 142 adapted to be opened by a pair of solenoids 144 connected to a source of energy and adapted to be energized when a circuit is established across contacts 145 by a broken blade 31, the contacts 145 being located in the drive drum housing 26 adjacent the drum 32 (Fig. 9). As shown in Fig. 2, the switch 142 is in a closed circuit position, while upon energization of solenoids 144, armature 143 thereof is attracted by the solenoids to open the motor circuit. The solenoids 144 also control actuation of the brake as about to be described.

As shown more particularly in Figs. 1, 10, 13 and 14, the brake comprises a friction disc 146 connected for rotation with the motor drive shaft 103, a yoke 147 secured to the motor frame having a bearing boss 149 in line with the motor shaft, a stud 150 mounted in said boss for axial movement but keyed therein against rotation (Fig. 14), a second friction disc 151 threaded on the inwardly facing end of the stud 150 positioned for engaging the disc 146, and a helical torsion spring 152 for normally holding the disc 151 out of contact with the disc 146.

Engagement of the discs 146 and 151 is effected by a flat spring 154 secured to the outer end of the stud 150, which spring is adapted to move the stud inwardly upon energization of the solenoids 144, the solenoids being supported by the yoke 147. When the disc 151 contacts the rotating disc 146, the disc 146 frictionally engages and rotates in turn the disc 151, so that the latter becomes unscrewed from the stud 150, thus increasing the pressure between the discs until they lock. Rotation of the motor shaft is then arrested to stop the machine. In order to release the brake, the motor shaft is rotated manually in the opposite direction of its normal rotation thereby causing the disc 151 to be screwed back on to the stud sufficiently to disengage it from the disc 146 and then enabling the spring 152 to complete re-threading of the disc 151 on the stud by its torsional force.

*The presser foot mechanism*

The presser foot mechanism is shown more particularly in Figs. 4, 11, and 12, and comprises a presser foot element 160 for engaging the stack of fabric F to be cut, a rod 161 for supporting the foot, and means for adjusting the rod vertically, generally indicated by the reference number 162.

The foot 160 has a slot 164 for reception of the cutting edges 33 of the blades 31 and an enlarged portion 165 at the open end of the slot for reception of the belt guide casing which holds the foot against rotation about its rod 161 (Fig. 12). The foot is slidably mounted on the rod 161 at its lower end and is yieldably supported by a spring 166.

The rod adjusting means 162, as shown in Fig. 11, includes a boss 167 provided on the housing 20 at the forward side, the boss having a downwardly and outwardly tapered bore 168 through which the rod 161 extends. A plurality of balls 169 are urged upwardly by a collar 170 extending about the rod under the influence of a spring 171 in the bore, whereby the balls are urged inwardly by the upwardly and inwardly tapered bores of the wall to engage the rod and secure the same against upward movement. However, downward movement of the rod by the operator is possible at any time. Whenever upward movement is then desired, as for a different thickness of fabric layers, these balls are caused to release the rod by downward movement of a bushing 172 slidably disposed in the upper end of the bore and slidably mounted on the rod for limited movement by a pin and groove connection 173.

From the foregoing description, it will be seen that the present invention provides an improved cutting machine of the character indicated herein which has a cooling and lubricating system for the blades, has a quick acting safety stop motion mechanism which protects the machine and the work against damage, has a readily adjustable variable drive mechanism and embodies features of construction which render the machine more practical and reliable for high speed operation. The machine is rugged in construction and can readily withstand such rough usage to which it may normally be subjected.

What is claimed:

1. In a cutting machine, the combination of a pair of spaced roll means, an endless belt supported on said roll means, cutting elements mounted on said belt at the inner side thereof, guide means between said roll means for positioning two strands of said belt adjacent each other for movement in opposite directions and with the cutting elements of the strands in sliding contact with each other, and means associated with one of said roll means for cooling said cutting elements.

2. A cutting machine according to claim 1, wherein said cooling means utilize air as a cooling medium.

3. A cutting machine according to claim 1, wherein said roll means having said cooling means associated therewith comprises a rotatable hollow drum provided with air entraining blades at the interior thereof, for directing air against said cutting elements.

4. A cutting machine according to claim 1, wherein said roll means having said cooling means associated therewith comprises a hollow drum provided with air entraining blades at the interior thereof for directing air against said cutting elements, and drive means are provided for rotating said drum to drive said belt.

5. A cutting machine according to claim 1, wherein said roll means having said cooling means associated therewith comprises a hollow drum provided with air entraining blades at the interior thereof for directing air against said cutting elements, and a chamber is provided about said drum having opening means for the strands of said belt and having air inlet and outlet openings cooperating with said air entraining blades for circulating air through said chamber to effect cooling of said blades.

6. In a cutting machine, the combination of a pair of spaced roll means, an endless belt supported on said roll means, cutting elements mounted on said belt at the inner side thereof, guide means between said roll means for positioning two strands of said belt adjacent each other for movement in opposite directions and with the cutting elements of the strands having surfaces in sliding contact with each other, and means associated with one of said roll means for applying a lubricating medium to said cutting elements.

7. In a cutting machine, the combination of a pair of spaced roll means; an endless belt supported on said roll means; cutting elements mounted on said belt having portions at each end extending laterally from an edge of said belt, one of said portions having a cutting edge thereon; and elongate guide means between said roll means, said guide means having a passage for receiving two opposite strands of said belt and for positioning the inner surfaces of the cutting elements on opposite strands in sliding contact with each other, said guide means having a single slit at one edge of said passage through which said cutting edges extend and having guide surfaces adjacent said slit and at the opposite edge of said passage for engagement by outer surfaces of said cutting element portions, said last mentioned guide surfaces aligning said belt and said cutting elements thereon whereby said cutting edges of elements on opposite strands are aligned.

8. In a cutting machine, an endless belt having a pair of contiguous strands moving in opposite directions, and cutting blades secured to said belt in spaced relation to each other each having a pair of cutting edges extending laterally of said belt, the blades of one strand slidably engaging and cooperating with the blades of the other strand to provide a shearing action.

9. In a cutting machine, an endless belt having a pair of strands moving in opposite directions, cutting blades secured to said belt at the inner side thereof and in spaced relation to each other each having a pair of cutting edges extending laterally of said belt, and means for guiding the strands in contiguous relation including means for maintaining said blades of the strands in alignment and in contiguous relation to provide a shearing action between the blades of the strands.

10. In a cutting machine, an endless belt having a pair of strands moving in opposite directions, cutting blades secured to said belt at the inner side thereof and in spaced relation to each other each having a pair of cutting edges extending laterally of said belt, means for guiding the strands in contiguous relation including means for maintaining said blades of the strands in alignment and in contiguous relation to provide a shearing action between the blades of the strands, and means for lubricating the contiguous surfaces of said blades.

References Cited in the file of this patent

UNITED STATES PATENTS

| Number | Name | Date |
|---|---|---|
| 328,094 | Walker | Oct. 13, 1885 |
| 337,630 | Shavalier et al. | Mar. 9, 1886 |
| 369,466 | Parshall | Sept. 6, 1887 |
| 381,466 | Dickerson | Apr. 17, 1888 |
| 567,282 | Roberts | Sept. 8, 1896 |
| 703,784 | Grosheim | July 1, 1902 |
| 892,460 | Spielman | July 7, 1908 |
| 1,496,035 | Thomson | June 3, 1924 |
| 1,807,889 | Belin | June 2, 1931 |
| 1,832,424 | Rau | Nov. 17, 1931 |
| 2,144,623 | Godfrey | Jan. 24, 1939 |
| 2,278,983 | Fuller | Apr. 7, 1942 |
| 2,340,547 | Mikami | Feb. 1, 1944 |
| 2,471,036 | Jenkins | May 24, 1949 |
| 2,500,321 | Petersen | Mar. 14, 1950 |
| 2,541,301 | Sissler | Feb. 13, 1951 |

FOREIGN PATENTS

| Number | Country | Date |
|---|---|---|
| 193,950 | Great Britain | Feb. 28, 1923 |